(12) United States Patent      (10) Patent No.: US 12,595,991 B2

Fukushima et al.      (45) Date of Patent: Apr. 7, 2026

(54) GAS GENERATOR

(71) Applicant: Daicel Corporation, Osaka (JP)

(72) Inventors: Akira Fukushima, Tokyo (JP); Shinya Yamamoto, Tokyo (JP); Narumi Mizuta, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/713,476

(22) PCT Filed: Oct. 18, 2022

(86) PCT No.: PCT/JP2022/038658

§ 371 (c)(1),
(2) Date: May 24, 2024

(87) PCT Pub. No.: WO2023/100507

PCT Pub. Date: Jun. 8, 2023

(65) Prior Publication Data

US 2025/0076010 A1     Mar. 6, 2025

(30) Foreign Application Priority Data

Nov. 30, 2021    (JP) ................................. 2021-194616

(51) Int. Cl.
   *B60R 22/46*      (2006.01)
   *F42B 3/28*      (2006.01)

(52) U.S. Cl.
   CPC ............ *F42B 3/28* (2013.01); *B60R 22/4628* (2013.01)

(58) Field of Classification Search
   CPC .. B60R 2021/26076; B60R 2021/2648; B60R 21/2644; B60R 21/264
   See application file for complete search history.

(56) References Cited

U.S. PATENT DOCUMENTS 3,877,721 A * 4/1975 Brown, Jr. ............ B60R 21/272
                                        280/736
5,344,186 A * 9/1994 Bergerson ............ B60R 21/264
                                        280/736

(Continued)

FOREIGN PATENT DOCUMENTS

DE      29821232 U1 *   4/1999   ......... B60R 21/264
DE      20318387 U1     2/2004

(Continued)

OTHER PUBLICATIONS

International Search Report and Written Opinion mailed on Dec. 13, 2022, received for PCT Application PCT/JP2022/038658, filed on Oct. 18, 2022, 11 pages including English Translation.

(Continued)

*Primary Examiner* — Nicole T Verley

(74) *Attorney, Agent, or Firm* — XSENSUS LLP

(57) ABSTRACT

A gas generator includes: an ignition device including an igniter, an igniter holding portion having a tubular shape and being configured to hold the igniter and a fixing portion made of resin and being configured to fix the igniter to the igniter holding portion; and a case having a bottomed tubular shape and being configured to accommodate a gas generating agent which combusts by actuation of the ignition device, the case being made of resin and including a side wall portion with a base end side being connected to the fixing portion, and a closing end portion configured to close a tip end side. The case includes an inclined surface extending obliquely with respect to an axial direction of the case on the tip end side, and a fragile part formed at an edge portion excluding at least a base end portion of the inclined surface.

13 Claims, 7 Drawing Sheets

(56) References Cited

U.S. PATENT DOCUMENTS

| | | | | | |
|---|---|---|---|---|---|
| 5,690,357 | A | * | 11/1997 | Cuevas | B60R 21/264 280/736 |
| 5,700,030 | A | * | 12/1997 | Goetz | B60R 21/2644 280/736 |
| 6,010,153 | A | * | 1/2000 | Halas | B60R 21/272 137/68.13 |
| 7,658,406 | B2 | * | 2/2010 | Townsend | B60R 21/264 280/736 |
| 7,845,679 | B2 | * | 12/2010 | Abaziou | B60R 21/2644 280/736 |
| 8,870,222 | B2 | * | 10/2014 | Kobayashi | B60R 21/272 280/736 |
| 11,155,234 | B2 | * | 10/2021 | Bierwirth | B60R 21/2644 |
| 2002/0062757 | A1 | | 5/2002 | Vetter | |
| 2005/0029785 | A1 | * | 2/2005 | Bilbrey | B60R 21/272 280/736 |
| 2005/0161922 | A1 | * | 7/2005 | Bilbrey | B60R 21/272 280/736 |
| 2006/0249938 | A1 | * | 11/2006 | Matsuda | B60R 21/261 280/736 |
| 2018/0045370 | A1 | * | 2/2018 | Nakashima | C22C 38/04 |

FOREIGN PATENT DOCUMENTS

| | | | | | |
|---|---|---|---|---|---|
| EP | 0776796 | A2 | * | 6/1997 | B60R 21/2644 |
| EP | 4596333 | A1 | * | 8/2025 | B60R 21/26 |
| FR | 2901523 | A1 | * | 11/2007 | B60R 21/2644 |
| JP | 4576282 | B2 | * | 11/2010 | |
| JP | 2015093596 | A | * | 5/2015 | F42B 3/10 |
| JP | 6154147 | B2 | * | 6/2017 | B60R 21/272 |
| JP | 2018075985 | A | * | 5/2018 | F42B 3/12 |
| JP | 2023032209 | A | * | 3/2023 | |
| JP | 7462518 | B2 | * | 4/2024 | B60R 21/272 |
| KR | 20190077346 | A | * | 7/2019 | B60R 21/264 |
| WO | WO-2015182389 | A1 | * | 12/2015 | B60R 21/272 |
| WO | WO-2016013630 | A1 | * | 1/2016 | B60R 21/2646 |
| WO | WO-2021075376 | A1 | * | 4/2021 | B60R 21/263 |
| WO | WO-2022044910 | A1 | * | 3/2022 | B60R 21/272 |
| WO | WO-2022209798 | A1 | * | 10/2022 | B60R 21/264 |
| WO | WO-2023100408 | A1 | * | 6/2023 | F42B 3/103 |
| WO | WO-2024135392 | A1 | * | 6/2024 | B01J 7/00 |

OTHER PUBLICATIONS

Supplementary European Search Report mailed Oct. 22, 2025, in European Application No. 22900941.0, 8 pages.

* cited by examiner

GAS GENERATOR

CROSS-REFERENCE TO RELATED APPLICATIONS

The present application is based on PCT filing PCT/JP2022/038658, filed Oct. 18, 2022, which claims priority from Japanese Patent Application No. 2021-194616, filed Nov. 30, 2021, the entire contents of each are incorporated herein by reference.

TECHNICAL FIELD

The present invention relates to a gas generator.

BACKGROUND ART

There is a proposal of a known gas generator including an outer housing having a receiving part having a cup shape and a cover closing the receiving part (e.g., Patent Document 1). In the present technique, the receiving part and the cover are made of resin and form an airtight housing that is protected from moisture ingress. In the gas generator of the present technique, during operation, the gas generating agent in the cover combusts to increase the pressure in the cover, and a part of the cover ruptures to discharge the gas.

CITATION LIST

Patent Document

Patent Document 1: US 2002/0062757 A

SUMMARY OF INVENTION

Technical Problem

In the gas generator, in a case where the case for accommodating the gas generating agent is made of resin, the resin generally has a break strength smaller than that of metal, and thus there is a high possibility that fragments thereof are scattered at the time of rupture of the case. Patent Document 1 above does not disclose any configuration or the like for suppressing scattering of fragments at the time of rupture of the case.

An object of the present disclosure is to provide a technique for suppressing scattering of a case at the time of rupture when the resin case is used.

Solution to Problem

To solve the above problem, the present disclosure adopts the following configuration.

A gas generator including:

an ignition device including an igniter, an igniter holding portion having a tubular shape and being configured to hold the igniter in a state of surrounding the igniter, and a fixing portion made of resin and being configured to fix the igniter to the igniter holding portion; and a case having a bottomed tubular shape and being configured to accommodate a gas generating agent which combusts by actuation of the ignition device, the case being made of resin and including a side wall portion with a base end side connected to the fixing portion, and a closing end portion configured to close a tip end side, in which the case includes an inclined surface extending obliquely with respect to an axial direction of the case on the tip end side, and a fragile part formed at an edge portion excluding at least a base end portion of the inclined surface.

In the gas generator described above, a top portion of the inclined surface may be a tip end of the closing end portion.

In the gas generator described above, in the case, the tip end of the closing end portion may rupture at a time of combustion of the gas generating agent, and the inclined surface may deform and thus open to an outside with a side of the base end portion of the inclined surface as a fulcrum.

In the gas generator described above, the case may include a restriction portion that is formed and thus surrounds the inclined surface, and restricts a deformation amount when the inclined surface opens outward.

In the gas generator described above, in the inclined surface, the base end portion of the inclined surface connected to the side wall portion may be thicker than another part.

In the gas generator described above, the inclined surface may be connected at the base end portion connected to the side wall portion, and the base end portion may be formed in a curved surface shape.

In the gas generator described above, in the inclined surface, a pair of flat surfaces each having a shape of an isosceles trapezoid with a short side arranged on the tip end side and a pair of flat surfaces each having a shape of an isosceles triangle with a vertex arranged on the tip end side may be arranged facing each other, and the top portion of the inclined surface may be formed by the short side of the isosceles trapezoid and the vertex of the isosceles triangle in a state where the flat surfaces of the isosceles trapezoid and the isosceles triangle are inclined to an inside of the case.

In the gas generator described above, the fragile part may be linearly formed at the top portion of the inclined surface and a contact portion between the isosceles trapezoid and the isosceles triangle adjacent to each other.

In the gas generator described above, the inclined surface may be formed by a combination of a plurality of isosceles trapezoids each having a short side and a long side disposed facing the short side, and the closing end portion may include a flat portion connected to the short side of each of the plurality of isosceles trapezoids.

In the gas generator described above, the case may have a columnar shape and may be fitted to a tubular portion that is an attachment target of the gas generator.

The above-described configurations can be combined or deleted as much as possible without departing from the gist of the present disclosure.

Advantageous Effects of Invention

According to an embodiment of the present disclosure, it is possible to provide a technique for suppressing scattering of a case at the time of rupture when the resin case is used.

DESCRIPTION OF EMBODIMENTS

A gas generator according to an embodiment of the present disclosure will be described below with reference to the drawings. Note that each of the configurations, combinations thereof, and the like in the embodiments are examples, and various additions, omissions, substitutions, and other changes of the configurations may be made as appropriate without departing from the spirit of the present disclosure. The present disclosure is not limited by the embodiments and is limited only by the claims.

First Embodiment

Figure 1:
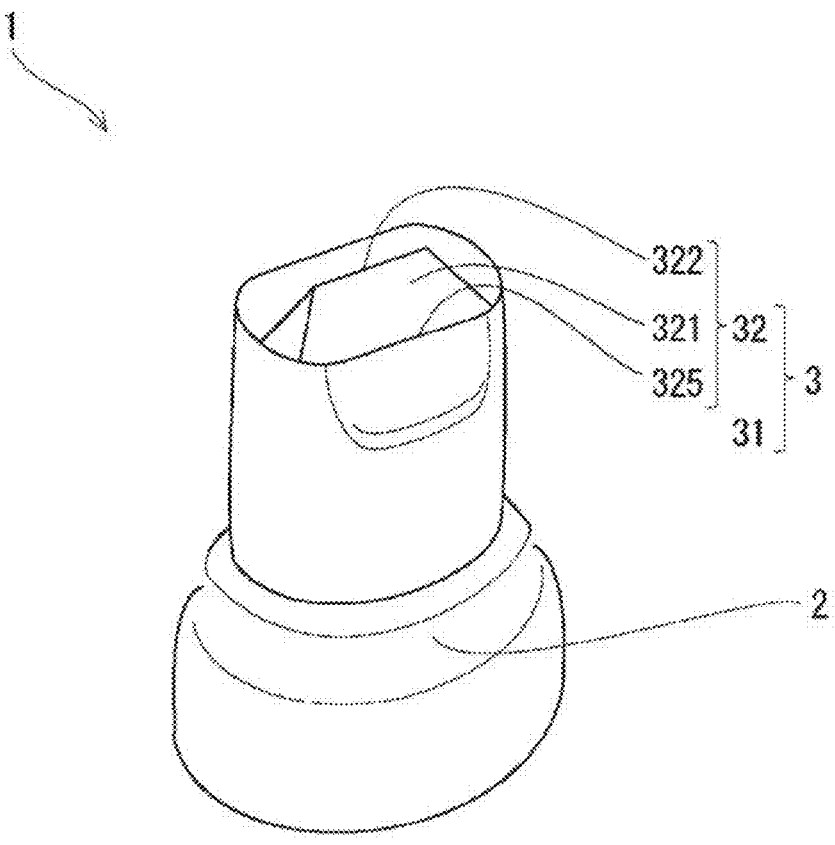
FIG. 1 is a perspective view illustrating an example of a gas generator according to a first embodiment.
Figure 2:
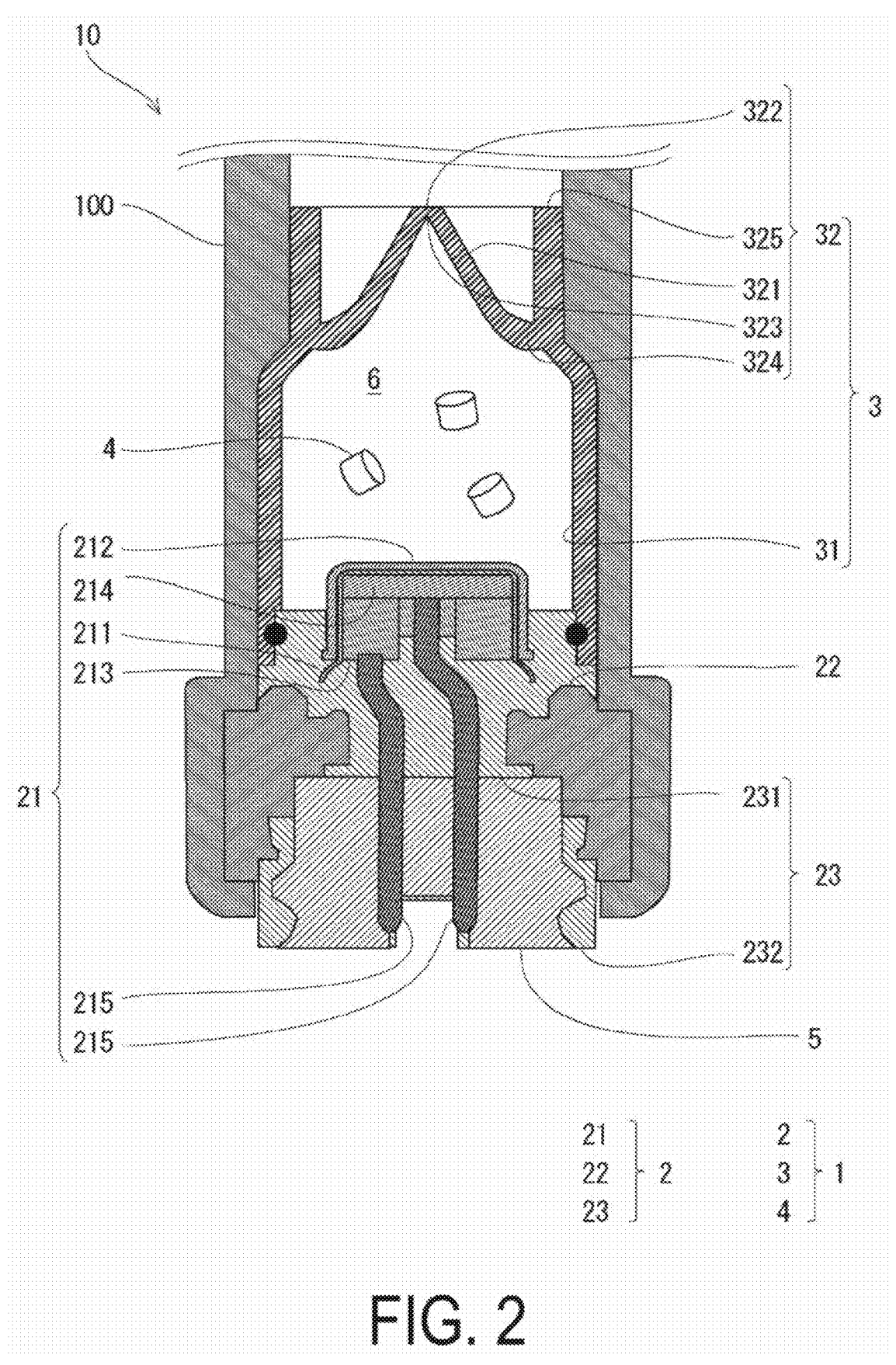
FIG. 2 is an axial schematic cross-sectional view illustrating an example of the gas generator according to the first embodiment attached to an attachment target.

FIG. 1 is a perspective view illustrating an example of a gas generator. FIG. 2 is an axial schematic cross-sectional view illustrating an example of the gas generator attached to an attachment target. When operated, a gas generator 1 causes an internal gas generating agent to combust and to release a generated combustion gas to the outside. As illustrated in FIG. 2, the gas generator 1 is incorporated in, for example, a seat belt retractor (pretensioner) 10 of an automobile, and is used to wind up a seat belt in the event of collision of the automobile. The gas generator 1 includes an ignition device 2 and a case 3, and internally accommodates a gas generating agent 4.
Ignition Device The ignition device 2 includes an igniter 21 that ignites by an ignition current, an igniter holding portion 22 supporting the igniter 21, and a fixing portion 23 interposed between the igniter 21 and the igniter holding portion 22.

The igniter 21 includes, for example, a cup body 211 having a bottomed tubular shape with one end opened, an insulating layer 212, a sealing member 213 closing an opening portion of the cup body 211, an ignition charge 214 accommodated in an ignition chamber formed by the cup body 211 and the sealing member 213, and two electro-conductive pins 215 for receiving supply of a current from the outside. Note that in the present embodiment, for convenience, the cup body 211 side will be described as an upper side, and the electro-conductive pin 215 side will be described as a lower side. The two electro-conductive pins 215 are connected via a bridge wire (not illustrated) in the ignition chamber. When the electro-conductive pin 215 is supplied with a current from the outside, the bridge wire that is a resistor generates heat to combust the ignition charge 214. Note that as the ignition charge 214, an existing ignition charge used in a general gas generator can be adopted. The cup body 211 is a member made of metal covered with the insulating layer 212 made of resin, for example. The sealing member 213 is also made of metal, for example, and the two electro-conductive pins 215 are insulated from each other. The cup body 211 has a radial notch (not illustrated) on the upper surface, for example, and is ruptured by a combustion product of the ignition charge 214 to release the combustion product such as flame or combustion gas or the like upward when the igniter 21 is in operation.

The igniter holding portion 22 is, for example, a metal collar supporting the side of the igniter 21. That is, the igniter holding portion 22 is a member made of metal formed in a tubular shape, and holds the igniter 21 inside thereof. Note that to suppress circumferential rotation of the fixing portion 23 with respect to the igniter holding portion 22, an inner peripheral surface of the igniter holding portion 22 in contact with the fixing portion 23 may be provided with recesses and protrusions. The igniter holding portion 22 is fixed, by crimping, to a tubular portion 100 that is an attachment target, which is a seat belt retractor body, for example. The tubular portion 100 is a tubular member into which the case 3 of the gas generator 1 can be inserted.

The fixing portion 23 is a connection portion made of resin that is interposed between the igniter 21 and the igniter holding portion 22 by injection molding and that fixes the igniter 21 to the igniter holding portion 22. As a material of the fixing portion 23, a resin material having excellent heat resistance, durability, corrosion resistance, and the like after curing can be suitably used. In the example of FIG. 2, the fixing portion 23 includes a first fixing portion 231 that is positioned on the upper side and fixes the cup body 211 and the like of the igniter 21, and a second fixing portion 232 that is positioned on the lower side and mainly surrounds the electro-conductive pin 215. The fixing portion 23 covers the periphery of the side of the igniter 21, and thus, for example, a part of the cup body 211 or the insulating layer 212 is in a state of being exposed from the fixing portion 23. Note that the entirety of the cup body 211 or the insulating layer 212 may be overmolded by the fixing portion 23. By being engaged with the inside of the igniter holding portion 22, the fixing portion 23 fixes the igniter 21 to the igniter holding portion 22. The second fixing portion 232 may fix, inside the igniter holding portion 22, a connector 5 for supplying the electro-conductive pin 215 with power from an external power source in a state of being connected to the electro-conductive pin 215.
Case The case 3 is a bottomed tubular member extending from the base end side (ignition device 2 side) toward the tip end side (upper side) in a manner that the case 3 surrounds the upper portion of the ignition device 2. The material of the case 3 is resin, and may be, for example, the identical resin to that of the fixing portion 23. The case 3 includes a side wall portion 31 having a tubular shape extending vertically and a closing end portion 32 closing an upper end. A combustion chamber 6 accommodating the gas generating agent 4 is formed between the case 3 and the igniter 21. The gas generating agent 4 is ignited by the operation of the igniter 21 and combusted to generate a combustion product such as combustion gas or the like.

The side wall portion 31 is a tubular portion whose inner diameter and outer diameter are constant or substantially constant. The base end side of the side wall portion 31 is connected to the fixing portion 23 by full circumference welding, for example. The full circumference welding is annular welding continuous in the circumferential direction, and refers to closing two members of the welding target without a gap. In the example of FIG. 2, parts to be welded by laser welding are indicated by black circles.

The closing end portion 32 is formed to have an elliptical (track or rounded rectangular) cross-sectional shape in a direction orthogonal to the axial direction of the case 3. The closing end portion 32 includes an inclined surface 321 extending obliquely with respect to the axial direction of the case 3 on the tip end side, and a fragile part 323 formed at an edge portion excluding a base end portion of the inclined surface 321. As illustrated in FIG. 1, the inclined surface 321 is constituted by four flat surfaces including two isosceles trapezoidal flat surfaces and two isosceles triangular flat surfaces, and when the gas generator 1 is viewed from above, the isosceles trapezoidal flat surfaces and the isosceles triangular flat surfaces are arranged facing each other. The two isosceles trapezoidal flat surfaces are arranged with the upper side becoming a short side, and the two isosceles triangular flat surfaces are arranged with the upper side becoming a vertex. In the present embodiment, the inclined surface 321 is inclined to the inside of the case 3, and a top portion 322 of the inclined surface 321 is formed by the short side of the isosceles trapezoid and the vertex of the isosceles triangle. This top portion 322 becomes a tip end of the closing end portion 32.

In the case 3, the inside of the top portion 322 becomes the fragile part 323. When the internal pressure of the case 3 increases, stress concentrates on the fragile part 323 inside the top portion 322. The fragile part 323 ruptures by an increase in the internal pressure of the case 3 or the temperature of the combustion product generated by combustion of the gas generating agent 4. Due to this, the tip end of the closing end portion 32 of the case 3 ruptures at the time of combustion of the gas generating agent 4, and each flat surface of the inclined surface 321 deforms and thus opens outward with the base end portion 324 side of the inclined surface 321 as a fulcrum. In this manner, the base end portion 324 of the inclined surface 321 becomes a hinge portion when the inclined surface 321 opens. The base end portion 324 is connected to the inner surface of the side wall portion 31. Note that the base end portion 324 is formed in a curved surface shape on the boundary side of the side wall portion 31 to prevent stress from not being concentrated when the internal pressure of the case 3 increases. In the inclined surface 321, the base end portion 324 connected to the side wall portion 31 of the case 3 is thicker than another part. Due to this, the gas generator 1 can suppress cutting off the inclined surface 321 from the base end portion 324 when the inclined surface 321 opens outward with the base end portion 324 as a hinge portion.

The case 3 has a restriction portion 325 that is formed and thus surrounds the inclined surface 321. The restriction portion 325 restricts the deformation amount thereof when the inclined surface 321 opens outward. The restriction portion 325 extends along the axial direction of the case 3. This enables the restriction portion 325 to restrict, to the axial direction of the case 3, the deformation amount in which the inclined surface 321 deforms to the outside. When the gas generator 1 is viewed in the up-down direction, the tip end of the restriction portion 325 and the top portion 322 of the inclined surface have the same height. Note that in the present embodiment, the restriction portion 325 is formed and continuously surrounds the inclined surface 321, but the restriction portion 325 may be formed and discontinuously surrounds the inclined surface 321.

The outside of a side surface of the case 3 has a shape along the inside of the tubular portion 100, which is the attachment target. That is, the side wall portion 31 is accommodated in a part of the tubular portion 100 where an inner periphery of the cross section is a perfect circle or a substantially perfect circle. The closing end portion 32 is accommodated in a part of the tubular portion 100 where the inner periphery of the cross section is an elliptical shape. Due to this, the case 3 is fitted to the tubular portion 100, which is the attachment target of the gas generator 1. The side surface of the case 3 is surrounded over the entire circumference by the tubular portion 100, which is the attachment target, and the inner surface of the attachment target has a shape corresponding to the side surface of the case 3, and therefore, even when the internal pressure of the case 3 increases, rupture of the side surface (side wall portion 31) of the case 3 is suppressed. The inner diameter of the part of the elliptical shape is smaller in a predetermined direction than the inner diameter of the part of a perfect circle or a substantially perfect circle. Since parts where the outer diameter of the case 3 is smaller on the tip end side than on the base end side are formed as flat portions at two locations facing the closing end portion 32 side of the case 3, the tubular portion 100 also complementarily faces the flat portions, and therefore, when the internal pressure of the case 3 increases, upward ejection of the case 3 is suppressed. Therefore, when the internal pressure of the case 3 increases, or when the case 3 is melted by the temperature of the combustion product generated by combustion of the gas generating agent 4, the fragile part 323 of the closing end portion 32 first ruptures to form an opening. Rotation of the gas generator 1 in the tubular portion 100 is also prevented.

Gas Generating Agent

As the gas generating agent 4, a predetermined gas generating agent is used. The combustion temperature of the gas generating agent 4 is from 1000° C. to 1700° C., for example. The gas generating agent 4 is formed of, for example, guanidine nitrate (41 wt. %), basic copper nitrate (49 wt. %), a binder, and additives. As the individual shape of the gas generating agent 4, a single hole columnar shape can be used. However, the gas generating agent 4 is not limited to that described above, and a nitrocellulosic composition can also be used for the gas generating agent 4.

Operation

In a state where the gas generator 1 is assembled to a seat belt retractor 10 of an automobile, for example, the connector 5 is connected to the two electro-conductive pins 215, and power can be supplied to the igniter 21. In this state, when a sensor (not illustrated) mounted on the automobile or the like senses an impact, the electro-conductive pin 215 is supplied with an ignition current, and the igniter 21 is operated. The igniter 21 causes the ignition charge 214 in the cup body 211 to combust, and thus the combustion product is released to the outside of the cup body 211. The gas generating agent 4 filled in the combustion chamber 6 is ignited by flame or combustion gas that is a combustion product of the ignition charge 214. By being combusted, the gas generating agent 4 generates combustion gas or the like as a combustion product.

Since the side surface (side wall portion 31) of the case 3 is surrounded over the entire circumference by the tubular portion 100, which is the attachment target, and the inner surface of the attachment target has a shape corresponding to the side surface of the case 3, rupture of the side surface of the case 3 is suppressed even when the internal pressure of the case 3 increases. Since the outer diameter of the case 3 includes a part where the tip end side is smaller than the base end side, when the internal pressure of the case 3 increases, upward ejection of the entirety of the case 3 is suppressed. Therefore, when the internal pressure of the case 3 increases, solely the fragile part 323 of the closing end portion 32 ruptures to form an opening. Even if melting of the case 3 occurs due to the temperature of a combustion product, the part to be melted is limited to the inclined surface 321 or a part thereof. Therefore, scattering of a part of the case 3 other than the fragile part 323 in the form of small pieces is suppressed. The fragile part 323 to rupture is sufficiently smaller than the cross section of the closing end portion 32, and even if fragments are generated, the fragments are combusted out by the combustion product of the gas generating agent 4, and the fragments of the case 3 are suppressed from entering the inside of the attachment target.

From the opening, the combustion gas is discharged into the seat belt retractor 10 that is an attachment target, for example. Then, the discharged combustion gas causes a predetermined mechanism of the seat belt retractor 10 to operate. Note that as the seat belt retractor 10, an existing configuration can be adopted. For example, the gas generator 1 is connected to one end of a pipe that is a part of the seat belt retractor 10, and moves a steel ball in the pipe by the pressure of combustion gas. The gear is rotated by the moving steel ball, and the seat belt retractor 10 applies the seat belt with pretension by winding the seat belt using the rotation of the gear as a power. At this time, since the gas generator 1 has one fragile part 323 at the center of the closing end portion 32, the flow direction of the gas discharged in the direction in which the pipe extends can be concentrated, and the force can be efficiently transmitted to the seat belt retractor 10.

In the case 3, after the fragile part 323 ruptures, the inclined surface 321 deforms and thus opens outward with the base end portion 324 side as a fulcrum. Due to this, in the gas generator 1, the opening of the case 3 is enlarged in diameter, and the combustion gas is easily discharged to the seat belt retractor 10. Since the closing end portion 32 has the inclined surface 321 extending obliquely with respect to the axial direction of the case 3, the amount of movement of the inclined surface 321 during operation is less than that of a closing end surface (see FIG. 7 described later) extending in a direction orthogonal to the axial direction, and the deformation amount of the inclined surface 321 to the outside is restricted by the restriction portion 325. Due to this, the gas generator 1 prevents too much deformation of the inclined surface 321, thereby preventing destruction of the inclined surface 321. The gas generator 1 prevents destruction of the inclined surface 321 to suppress generation of fragments thereof, thereby suppressing fragments of the inclined surface 321 from entering the seat belt retractor 10. Note that as examples of destruction of the inclined surface 321 include cutting off of the inclined surface 321 at the base end portion 324. In this manner, according to the gas generator 1 according to the present embodiment, when the case 3 made of resin is used, scattering of the case 3 at the time of rupture can be suppressed.

Modifications

Figure 3:
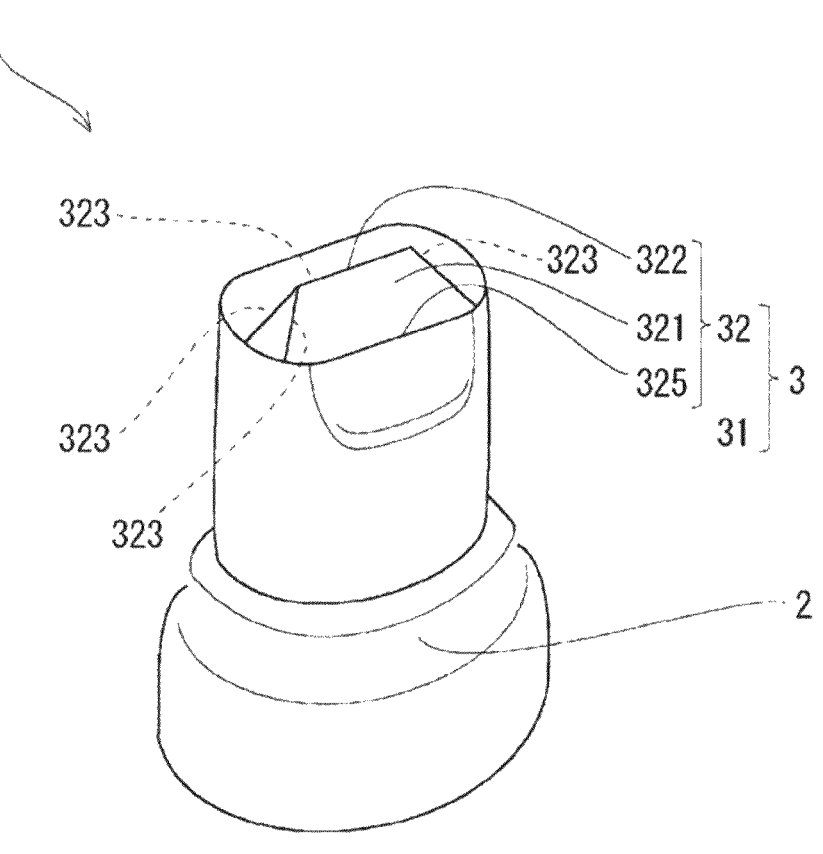
FIG. 3 is a perspective view illustrating an example of a gas generator according to a modification of the first embodiment.

FIG. 3 is a perspective view illustrating an example of a gas generator according to a modification of the first embodiment. In the present modification, the fragile part 323 is formed in a linear shape not only in a part where the short sides of the isosceles trapezoids are in contact with each other but also in a contact portion between the isosceles trapezoid and the isosceles triangle adjacent to each other.

The fragile part 323 is formed inside the case 3 as illustrated in FIG. 2, and FIG. 3 indicates a formation range of the fragile part 323 when the case 3 is viewed from the outside. Note that the linear shape in this case includes a state in which the fragile part 323 is formed continuously or discontinuously in the extending direction thereof. The fragile part 323 may be formed outside the closing end portion 32 (on the top portion 322 side).

Second Embodiment

Figure 4:
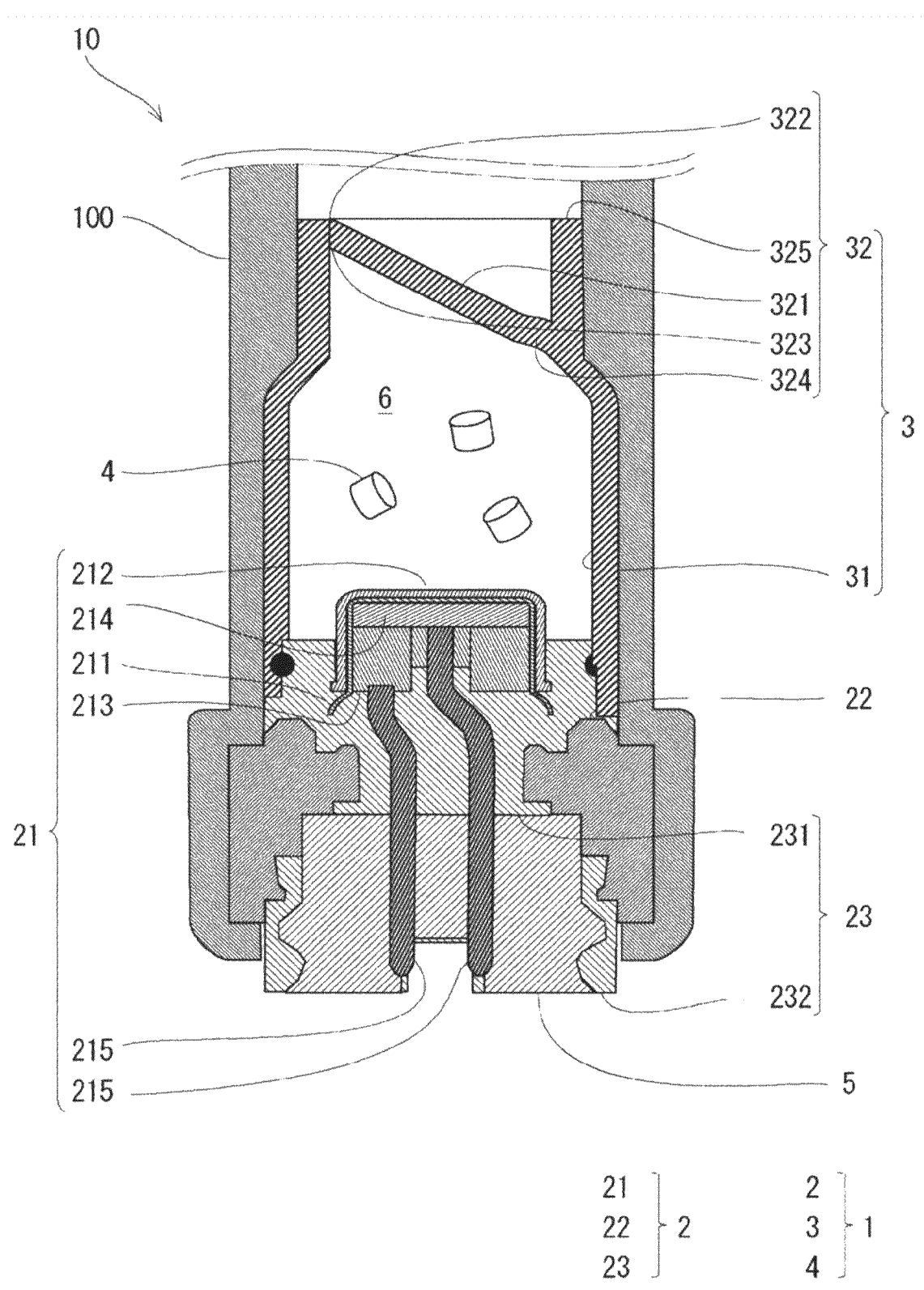
FIG. 4 is a schematic cross-sectional view illustrating an example of a gas generator according to a second embodiment.

FIG. 4 is a schematic cross-sectional view illustrating an example of the gas generator according to the second embodiment. Note that constituent elements corresponding to the constituent elements in the first embodiment described above are given the identical reference signs, and the description will be omitted.

In the gas generator 1 according to the present embodiment, the inclined surface 321 is formed in an annular shape except for one straight part of the elliptical shape of the closing end portion 32, and is connected to the one straight part. The outside of this connection part is the top portion 322 of the inclined surface 321, and the inside thereof is the fragile part 323.

Also in such a gas generator 1, when the internal pressure of the case 3 increases, stress concentrates on the fragile part 323 inside the top portion 322. The fragile part 323 ruptures by an increase in the internal pressure of the case 3. Even if melting of the case 3 occurs due to the temperature of a combustion product, the part to be melted is limited to the inclined surface 321 or a part thereof. Due to this, the tip end of the closing end portion 32 of the case 3 ruptures at the time of combustion of the gas generating agent 4, and the inclined surface 321 having an annular shape deforms and thus opens outward with the base end portion 324 side of the inclined surface 321 as a fulcrum.

When the internal pressure of the case 3 increases, or when the case 3 is melted by the temperature of the combustion product generated by combustion of the gas generating agent 4, the fragile part 323 solely ruptures to form an opening. At this time, scattering of a part of the case 3 other than the fragile part 323 in the form of small pieces is suppressed. Although the inclined surface 321 deforms to the outside, the deformation amount of the inclined surface 321 is restricted by the restriction portion 325. Similarly to the above-described first embodiment, the gas generator 1 according to the present embodiment can also suppress scattering of the case 3 at the time of rupture when the case 3 made of resin is used.

THIRD EMBODIMENT

Figures 5A, 5B:
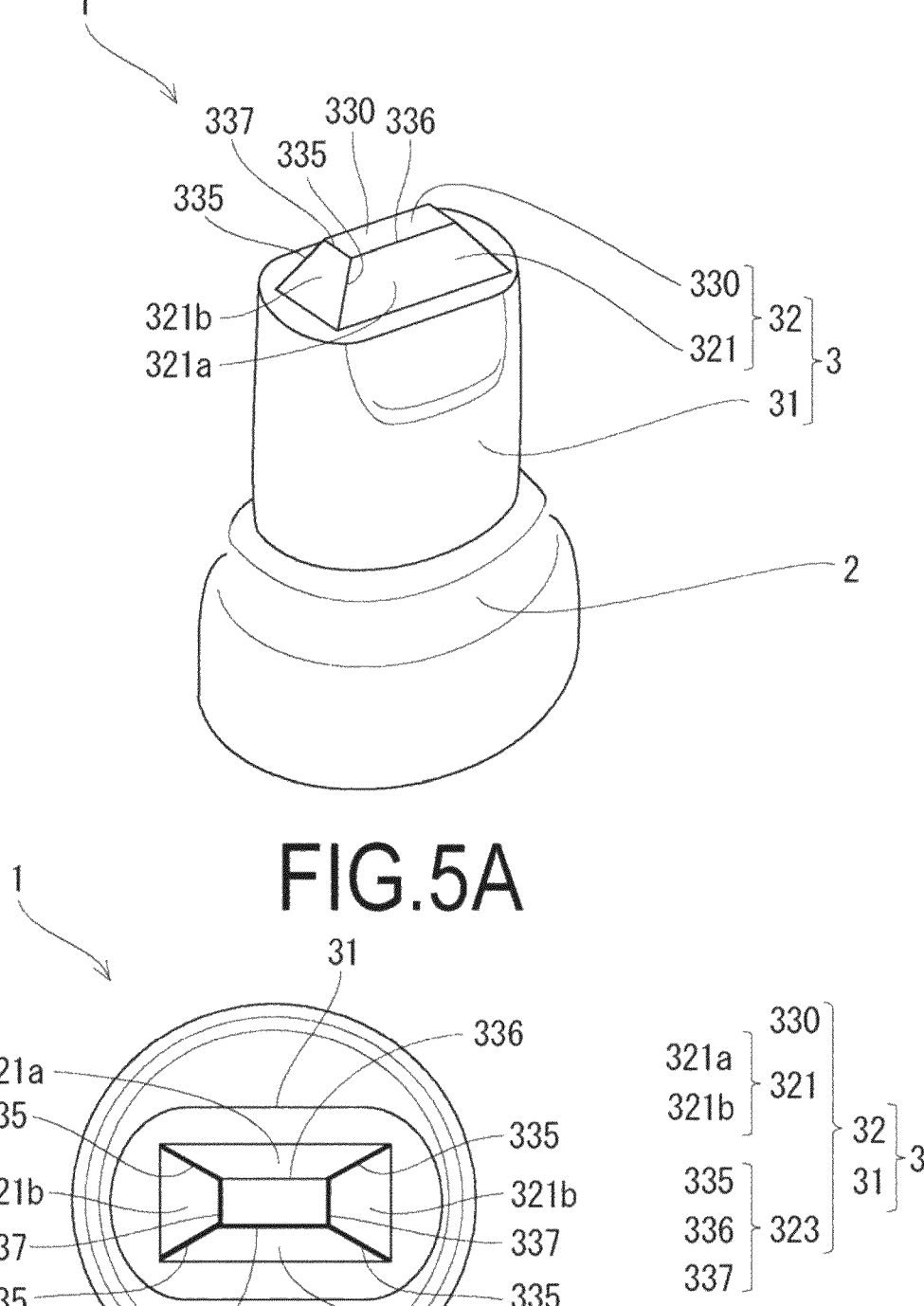
FIG. 5A is a perspective view illustrating an example of a gas generator according to a third embodiment.
FIG. 5B is a plan view of the gas generator according to the third embodiment as viewed from above.

FIG. 5A is a perspective view illustrating an example of the gas generator according to the third embodiment, and FIG. 5B is a view of the gas generator according to the third embodiment as viewed from above. Note that constituent elements corresponding to the constituent elements in the first embodiment described above are given the identical reference signs, and the description will be omitted. The restriction portion 325 in the first embodiment is not illustrated in FIGS. 5A and 5B and FIG. 6 described later.

In the gas generator 1 according to the present embodiment illustrated in FIGS. 5A and 5B, the inclined surface 321 forming the closing end portion 32 is formed by combining a plurality of isosceles trapezoids each having a short side disposed on the upper side and a long side disposed facing the short side. The short side of the isosceles trapezoid is disposed on a relatively upper side of the gas generator 1, and the long side of the isosceles trapezoid is disposed on a relatively lower side of the gas generator 1, and the orientation (up-down arrangement directions) of the short sides and the long sides of each are aligned. Specifically, the inclined surface 321 is formed of two types of isosceles trapezoids of two first trapezoids 321a and two second trapezoids 321b. The first trapezoid 321a is larger in area than the second trapezoid 321b. The two first trapezoids 321a are arranged facing each other, and the two second trapezoids 321b are arranged facing each other. When the gas generator 1 is viewed in the circumferential direction, the first trapezoids 321a and the second trapezoids 321b are alternately arranged side by side. The first trapezoid 321a has a short side and a long side that are longer than those of the second trapezoid 321b, and the cross-sectional shape of the case 3 on the closing end portion 32 side is an elliptical shape including two straight lines parallel to each other. The long side of the first trapezoid 321a is disposed on the straight line side of the ellipse, and the long side of the second trapezoid 321b is disposed on the curved line side of the ellipse. Furthermore, the closing end portion 32 has a flat portion 330 having a rectangular shape that forms a tip end of the case 3. The flat portion 330 is in contact with the short side of each of the first trapezoid 321a and the second trapezoid 321b, and the length of each side of the flat portion 330 is equal to the length of the short side of each. The closing end portion 32 forms a quadrangular pyramid shape by the first trapezoid 321a, the second trapezoid 321b, and the flat portion 330.

The fragile part 323 formed inside the closing end portion 32 is formed in a straight line in a contact portion 335 between the first trapezoid 321a and the second trapezoid 321b adjacent to each other, a contact portion 336 between the short side of the first trapezoid 321a and the flat portion 330, and a contact portion 337 between the short side of the second trapezoid 321b and the flat portion 330. In FIG. 5B, a thick line indicates the formation range of the fragile part 323. Note that in the present embodiment, there are two contact portions 336 between the short side of the first trapezoid 321a and the flat portion 330, but the fragile part 323 is formed in only one of the two contact portions 336. Note that the fragile part 323 may be formed outside the closing end portion 32.

The flat portion 330 is formed to have the same thickness as that of the first trapezoid 321a and the second trapezoid 321b except for the fragile part 323, but for example, the entire range surrounded by the contact portions 336 and 337 can be thinned. In this case, the fragile part 323 is formed in the contact portion 335 between the first trapezoid 321a and the second trapezoid 321b. Note that the third embodiment is similar to the first and second embodiments in that the strength is increased by increasing the thickness of the base end portion 324 (see FIGS. 2 and 3) connected to the side wall portion 31, of the first trapezoid 321a and the second trapezoid 321b.

Figure 6:
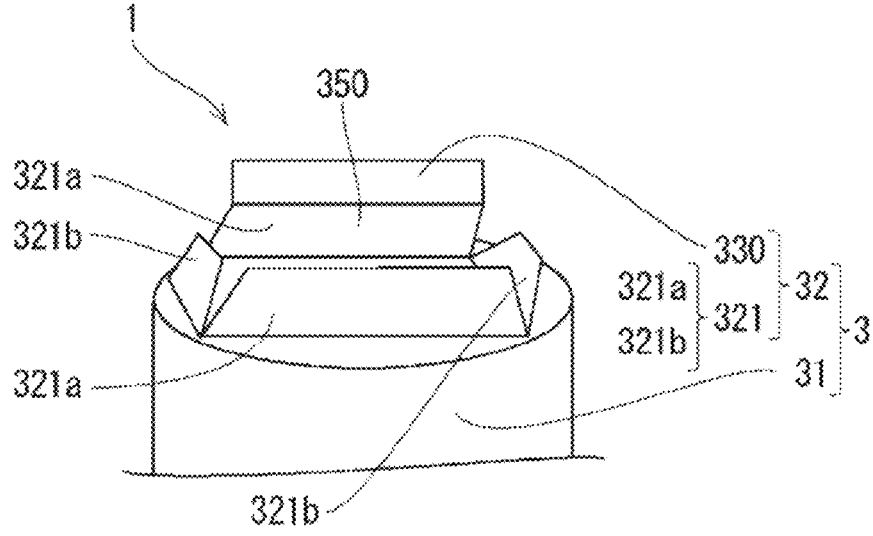
FIG. 6 is a perspective view illustrating a state of a closing end portion when the gas generator according to the third embodiment operates.

FIG. 6 is a perspective view illustrating a state of the closing end portion 32 when the gas generator 1 according to the present embodiment operates. In FIG. 6, only the closing end portion 32 and the side wall portion 31 in the vicinity thereof are extracted and illustrated. In the gas generator 1, when the pressure in the case 3 increases by combustion of the gas generating agent 4 illustrated in FIGS. 2 and 3, and the fragile part 323 preferentially ruptures by this pressure increase, the first trapezoid 321a and the second trapezoid 321b are open to the outside to form an opening 350. That is, the inclined surface 321 ruptures at the contact portion 335 (see FIG. 5A and FIG. 5B) between the first trapezoid 321a and the second trapezoid 321b. The flat portion 330 ruptures at the fragile part 323 formed in the contact portions 337 at two positions between the flat portion 330 and the two second trapezoids 321b. One of the two first trapezoids 321a ruptures at the fragile part 323 because the fragile part 323 is formed at the contact portion 336 with the flat portion 330, but the flat portion 330 is open in a state of being connected to one of the first trapezoids 321a as illustrated in FIG. 6 because the fragile part 323 is not formed at the other contact portion 336. When the inclined surface 321 opens, the base end portion 324 (see FIGS. 2 and 3) functions as a hinge, therefore the first trapezoid 321a and the second trapezoid 321b open radially outward about the respective base end portions 324, and the opening 350 is formed in the closing end portion 32. If the flat portion 330 is thinner in thickness than other portions (e.g., inclined surface 321) forming the case 3, the flat portion 330 is easily melted when the gas generator 1 is in operation, and therefore fragments of the flat portion 330 are less likely to be generated. Therefore, the area of the flat portion 330 can be preferably narrower than that of the first trapezoid 321a, and may be equal to or narrower than that of the second trapezoid 321b. Similarly to the above-described first embodiment, the gas generator 1 according to the present embodiment can also suppress scattering of the case 3 at the time of rupture when the case 3 made of resin is used.

Note that when the gas generator 1 according to the third embodiment is attached to the tubular portion 100 (see FIGS. 2 and 3) that becomes the attachment target, the side wall portion 31 of the case 3 is disposed in a state of being along the inside of the tubular portion 100. At this time, the second trapezoid 321b may be formed in the closing end portion 32 and thus the second trapezoid 321b is also disposed along the inside of the tubular portion 100. In this case, only the first trapezoidal portion 321a ruptures and is developed from the fragile part 323 during operation of the gas generator 1, and the second trapezoid 321b is held inside the tubular portion 100 and is not inflated. Note that as described above, the flat portion 330 may be inflated while being connected to any one of the first trapezoids 321a.

Note that in the gas generator 1 according to the third embodiment, the first trapezoid 321a and the second trapezoid 321b may be formed in the same shape and size, and the flat portion 330 may be formed in a square shape. By forming three or five or more of the first trapezoids 321a or the second trapezoids 321b having the identical shape, the shape of the flat portion 330 can also be a polygon along the short side of the first trapezoid 321a or the second trapezoid 321b.

Comparative Example

Figure 7:
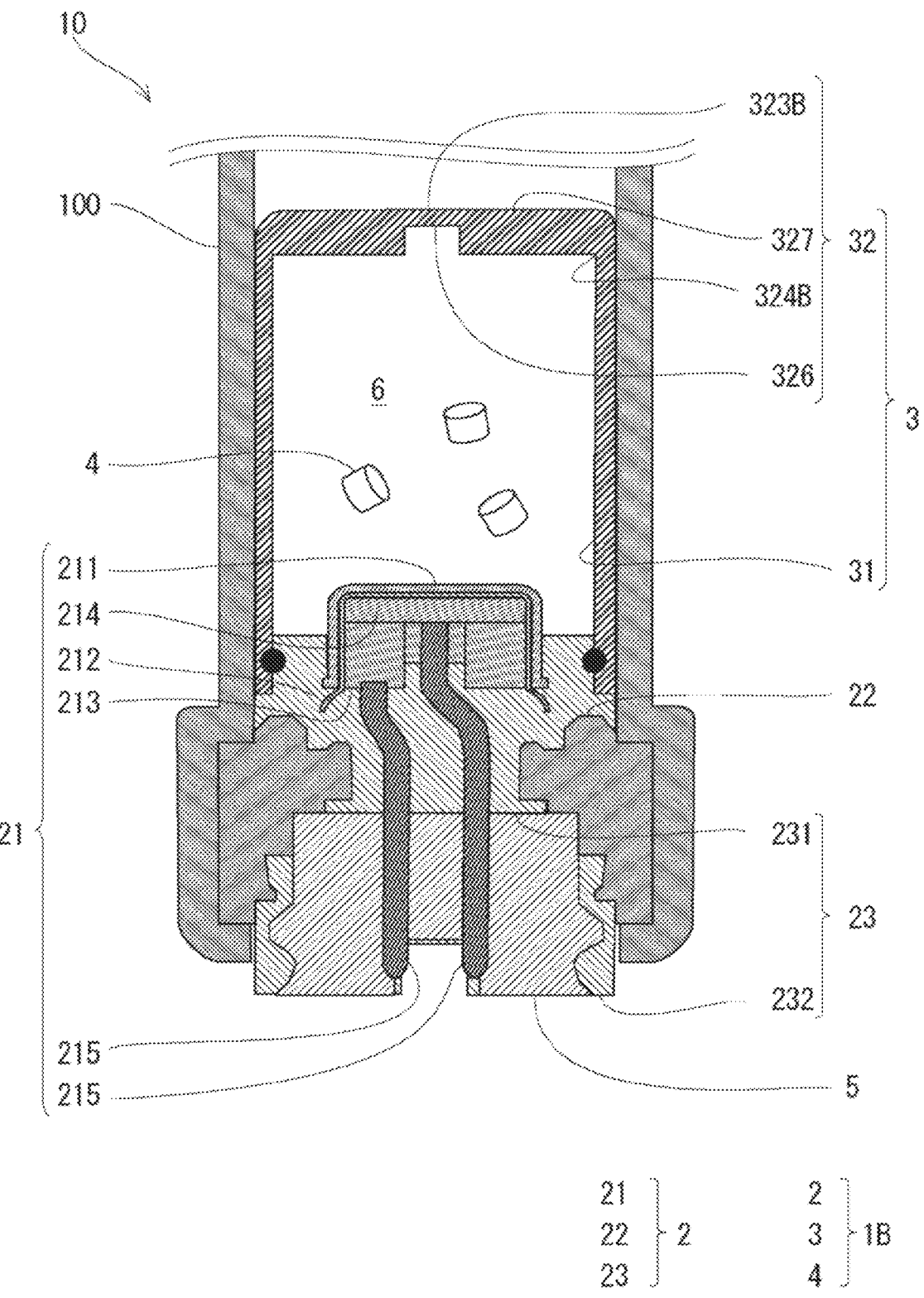
FIG. 7 is a schematic cross-sectional view illustrating an example of a gas generator according to a comparative example.

FIG. 7 is a schematic cross-sectional view illustrating an example of a gas generator 1B according to a comparative example. Note that constituent elements corresponding to the constituent elements in the first embodiment or the second embodiment described above are given the identical reference signs, and the description will be omitted.

In the example of FIG. 7, the gas generator 1B does not have the inclined surface 321, and the internal space of the case 3 has a columnar shape over the entire length. A recess part is formed at the center inside the closing end portion 32, and the tip end 326 of the recess part forms a fragile part 323B thinner than a thick part 327 in the periphery. When the gas generator 1B does not have the inclined surface 321, stress is also concentrated on a base end portion 324B formed between the side wall portion 31 and the closing end portion 32. Therefore, not only the fragile part 323B ruptures, but also the closing end portion 32 is radially torn from the fragile part 323B, and the closing end portion 32 is easily inflated outward by about 90 degrees about the base end portion 324B. When the closing end portion 32 is open outward by about 90 degrees, the base end portion 324B may be further torn and fragments of the closing end portion 32 may be scattered.

On the other hand, in the case of the gas generator 1 according to the first embodiment or the second embodiment, only the fragile part 323 can be ruptured by forming the inclined surface 321 in the case 3. Due to this, the gas generator 1 can suppress entering of fragments of the case 3 toward the attachment target. Furthermore, the inclined surface 321 deforms to the outside after the rupture of the fragile part 323. The gas generator 1 prevents too much deformation of the inclined surface 321 by providing the restriction portion 325, thereby preventing destruction of the inclined surface 321. According to the gas generator 1, when the case 3 made of resin is used, scattering of the case 3 at the time of rupture can be suppressed.

Other

Each aspect disclosed in the present specification can be combined with any other feature disclosed herein. For example, the inclined surface 321 of the case 3 may be configured by a combination of a flat surface and an annular surface. The inclined surface 321 of the case 3 may include three or more flat surfaces (e.g., a triangular flat surface).

REFERENCE SIGNS LIST 1, 1B Gas generator
2 Ignition device
21 Igniter
211 Cup body
212 Insulating layer
213 Sealing member
214 Ignition charge
215 Electro-conductive pin
22 Igniter holding portion
23 Fixing portion
231 First fixing portion
232 Second fixing portion
3 Case
31 Side wall portion
32 Closing end portion
321 Inclined surface
321a First trapezoid
321b Second trapezoid
322 Top portion
323, 323B Fragile part
324, 324B Base end portion
325 Restriction portion
326 Tip end
327 Thick part
335, 336, 337 Contact portion
4 Gas generating agent
5 Connector
6 Combustion chamber
10 Seat belt retractor
100 Tubular portion (attachment target)

The invention claimed is:

1. A gas generator comprising:
an ignition device including an igniter, an igniter holding portion having a tubular shape and being configured to hold the igniter in a state of surrounding the igniter, and a fixing portion made of resin and being configured to fix the igniter to the igniter holding portion; and
a case having a bottomed tubular shape and being configured to accommodate a gas generating agent which combusts by actuation of the ignition device, the case being made of resin and including a side wall portion with a base end side connected to the fixing portion, and a closing end portion configured to close a tip end side, wherein
the case includes
an inclined surface extending obliquely with respect to an axial direction of the case on the tip end side,
a fragile part formed at an edge portion excluding at least a base end portion of the inclined surface,
a top portion of the inclined surface is a tip end of the closing end portion,
in the case, the tip end of the closing end portion ruptures at a time of combustion of the gas generating agent, and the inclined surface deforms and thus opens outward with a side of the base end portion of the inclined surface as a fulcrum, and
the case includes a restriction portion that is formed and thus surrounds the inclined surface, and restricts a deformation amount when the inclined surface opens outward.

2. The gas generator according to claim 1, wherein
in the inclined surface, the base end portion of the inclined surface connected to the side wall portion is thicker than another part.

3. The gas generator according to claim 1, wherein
the inclined surface is connected at the base end portion connected to the side wall portion, and
the base end portion is formed in a curved surface shape.

4. The gas generator according to claim 1, wherein
in the inclined surface,
a pair of flat surfaces each having a shape of an isosceles trapezoid with a short side arranged on the tip end side and a pair of flat surfaces each having a shape of an isosceles triangle with a vertex arranged on the tip end side are arranged facing each other, and
the top portion of the inclined surface is formed by the short side of the isosceles trapezoid and the vertex of the isosceles triangle in a state where the flat surfaces of the isosceles trapezoid and the isosceles triangle are inclined to an inside of the case.

5. The gas generator according to claim 4, wherein
the fragile part is linearly formed at the top portion of the inclined surface and a contact portion between the isosceles trapezoid and the isosceles triangle adjacent to each other.

6. The gas generator according to claim 1, wherein
the inclined surface is formed by a combination of a plurality of isosceles trapezoids each having a short side and a long side disposed facing the short side, and
the closing end portion includes a flat portion connected to the short side of each of the plurality of isosceles trapezoids.

7. The gas generator according to claim 1, wherein
the case has a columnar shape and is fitted to a tubular portion that is an attachment target of the gas generator.

8. The gas generator according to claim 2, wherein the inclined surface is connected at the base end portion connected to the side wall portion, and the base end portion is formed in a curved surface shape.

9. A gas generator, comprising:

an igniter; and a case having a bottomed tubular shape and including, a side wall with an open end connected to the igniter, an opposed end opposite to the open end, an inclined surface provided in the opposed end formed obliquely with respect to an axial direction of the case, a fragile part formed at an edge portion of the inclined surface, and a restrictor provided around the inclined surface and restricts a deformation amount when the inclined surface opens in the fragile part.

10. A gas generator according to claim 9, wherein the inclined surface is connected at the side wall, and a connecting area between the inclined surface and the side wall in an inner side thereof is formed in a curved surface shape.

11. A gas generator according to claim 10, wherein the connecting area between the inclined surface and the side wall is thicker than other portion of the case.

12. A gas generator according to claim 9, wherein the restrictor extends in the axial direction from the connecting area and is provided to surround the inclined surface continuously or discontinuously.

13. A gas generator, comprising:

an igniter; and a case having a bottomed tubular shape and including, a side wall with an open end connected to the igniter, an opposed end opposite to the open end, an inclined surface provided in the opposed end formed obliquely with respect to an axial direction of the case, a fragile part formed at an edge portion of the inclined surface, and a connecting area provided between the inclined surface and the side wall in an inner side thereof and formed in a curved surface shape so as to be thicker than other portion of the case.

* * * * *